(12) United States Patent
Volz et al.

(10) Patent No.: US 6,722,350 B2
(45) Date of Patent: Apr. 20, 2004

(54) METHOD FOR OPERATING AN INTERNAL COMBUSTION ENGINE

(75) Inventors: Dieter Volz, Heilbronn (DE); Ernst Wild, Oberriexingen (DE); Manfred Pfitz, Vaihingen (DE); Werner Mezger, Eberstadt (DE); Juergen Pantring, Schwieberdingen (DE); Michael Oder, Illingen (DE); Werner Hess, Stuttgart (DE); Georg Mallebrein, Korntal-Muenchingen (DE); Christian Koehler, Erligheim (DE); Kristina Eberle, Markgrönigen (DE); Roland Herynek, Oetisheim (DE); Detlef Heinrich, Ludwigsburg (DE); Mirjam Steger, Vaihingen (DE); Gudrun Menrad, Stuttgart (DE); Lutz Reuschenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 10/169,936

(22) PCT Filed: Jan. 9, 2001

(86) PCT No.: PCT/DE01/00046
§ 371 (c)(1),
(2), (4) Date: Aug. 16, 2002

(87) PCT Pub. No.: WO01/51791
PCT Pub. Date: Jul. 19, 2001

(65) Prior Publication Data
US 2003/0051701 A1 Mar. 20, 2003

(30) Foreign Application Priority Data
Jan. 15, 2002 (DE) ......................................... 100 01 458

(51) Int. Cl.$^7$ ........................... F02M 25/07; F02D 41/38
(52) U.S. Cl. ................... 123/568.16; 123/295; 701/108
(58) Field of Search ................................. 123/295, 305, 123/568.11, 568.16, 568.21; 701/103, 108, 114, 115

(56) References Cited

U.S. PATENT DOCUMENTS

| | | | |
|---|---|---|---|
| 5,113,835 A | | 5/1992 | Seki et al. ............. 123/568.16 |
| 5,896,839 A | * | 4/1999 | Togai ......................... 123/295 |
| 6,024,069 A | * | 2/2000 | Yoshino ..................... 123/295 |
| 6,202,624 B1 | * | 3/2001 | Stuerz et al. ............... 123/295 |
| 6,430,495 B2 | * | 8/2002 | Takaku et al. .............. 123/295 |

FOREIGN PATENT DOCUMENTS

| | | |
|---|---|---|
| DE | 197 27 385 | 1/1999 |
| EP | 0 882 877 | 12/1998 |

* cited by examiner

Primary Examiner—Willis R. Wolfe
(74) Attorney, Agent, or Firm—Walter Ottesen

(57) ABSTRACT

An internal combustion engine (1), especially of a motor vehicle, is described. The engine (1) is provided with a combustion chamber (4) into which fuel can be injected in a first operating mode during a compression phase and in a second operating mode during an induction phase. The engine (1) is provided with a control apparatus (18) for switching over between the operating modes. The engine (1) includes an exhaust-gas recirculation having an exhaust-gas recirculation valve (14). The engine (1) is switched by the control apparatus (18) into the first operating mode when the exhaust-gas recirculation valve (14) is jammed in the open state.

7 Claims, 1 Drawing Sheet

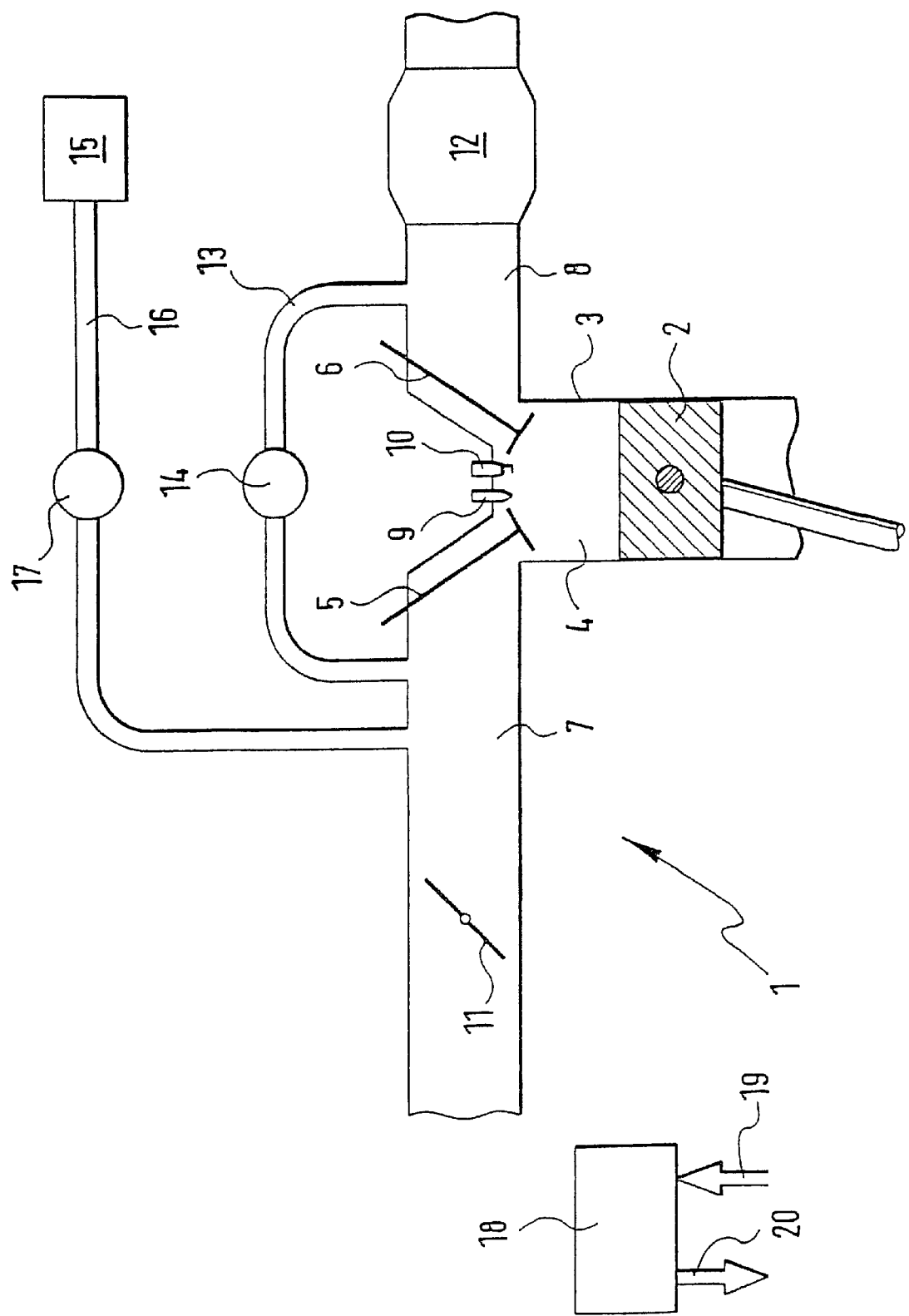

METHOD FOR OPERATING AN INTERNAL COMBUSTION ENGINE

FIELD OF THE INVENTION

The invention relates to a method for operating an internal combustion engine, especially of a motor vehicle, wherein fuel is injected into a combustion chamber in a first operating mode during a compression phase and in a second operating mode during an induction phase. In the method, there is a switchover between the operating modes and the internal combustion engine has an exhaust-gas recirculation with an exhaust-gas recirculation valve. The invention likewise relates to a corresponding internal combustion engine as well as a corresponding control apparatus for an engine of this kind.

BACKGROUND OF THE INVENTION

A method of this kind, an internal combustion engine of this kind and a control apparatus of this kind are all, for example, known from a so-called gasoline direct injection. There, fuel is injected into the combustion chamber of the engine in a homogeneous operation during the induction phase or in a stratified operation during the compression phase. The homogeneous operation is preferably provided for the full-load operation of the engine; whereas, the stratified operation is suitable for idle operation and part-load operation.

In an internal combustion engine of this kind, fault functions can occur. Accordingly, it is, for example, possible that the exhaust-gas recirculation valve jams or can no longer be moved. In this case, it must be ensured that the engine does not go into a critical operating state.

SUMMARY OF THE INVENTION

It is an object of the invention to provide a method for operating the internal combustion engine wherein it is ensured that fault functions of the exhaust-gas recirculation do not lead to critical operating states of the engine.

This object is solved in accordance with the invention in a method of the kind mentioned initially herein in that the engine is switched over into the first operating mode when the exhaust-gas recirculation valve jams in the open position. The task of the invention is solved correspondingly in an internal combustion engine and a control apparatus of the kind mentioned initially herein.

If the exhaust-gas recirculation valve jams in the open position, then the engine is switched over into the stratified operation in accordance with the invention. In the stratified operation, the open exhaust-gas recirculation valve can be easily considered in the control (open loop and/or closed loop) of the engine. A critical state can therefore not occur. With the selection of the stratified operation as an emergency operation, a reliable operation of the engine is ensured. The disadvantage that, in stratified operation, only a reduced torque can be generated by the engine is greatly outweighed by the advantage of a reliable operation.

In an advantageous further embodiment of the invention, the engine is switched over into the second operating mode when the exhaust-gas recirculation valve is jammed in the closed state.

If the exhaust-gas recirculation valve jams in the closed state, then the engine is switched over into the homogeneous operation in accordance with the invention. In the homogeneous operation, and for a closed exhaust-gas recirculation valve, the engine can be easily operated and especially without exceeding exhaust-gas limit values. A reliable operation of the engine is thereby provided also in this fault case.

In a further advantageous embodiment of the invention, the exhaust-gas recirculation valve is closed in another fault function of the exhaust-gas recirculation and the engine is switched over into the second operating mode. It is especially advantageous when a jamming of the exhaust-gas recirculation valve is determined with the aid of a sensor.

Of special significance is the realization of the method of the invention in the form of a control element which is provided for a control apparatus of an engine, especially of a motor vehicle. A program is stored on the control element which is capable of being run on a computer, especially on a microprocessor, and is suitable for executing the method according to the invention. In this case, the invention is realized by a program stored on the control element so that this control element, which is provided with the program, defines the invention in the same way as the method which the program can carry out. Especially an electric storage medium can be used as a control element, for example, a read-only-memory or a flash memory.

Further features, application possibilities and advantages of the invention will become apparent from the following description of embodiments of the invention which are illustrated in the drawing. All described or illustrated features define the subject matter of the invention by themselves or in any desired combination independently of their summary in the patent claims or their dependency as well as independently of their formulation or presentation in the description and/or in the drawing.

BRIEF DESCRIPTION OF THE DRAWINGS

The single FIGURE of the drawing shows a schematic block circuit diagram of an embodiment of an internal combustion engine according to the invention.

DESCRIPTION OF THE PREFERRED EMBODIMENTS OF THE INVENTION

In the FIG., an internal combustion engine 1 of a motor vehicle is shown wherein a piston 2 is movable back and forth in a cylinder 3. The cylinder 3 is provided with a combustion chamber 4 which is, inter alia, delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited with the spark plug 10.

A rotatable throttle flap 11 is mounted in the intake manifold 7 and air can be supplied via the throttle flap to the intake manifold 7. The quantity of the supplied air is dependent upon the angular position of the throttle flap 11. A catalytic converter 12 is accommodated in the exhaust-gas pipe 8 and this catalytic converter serves to purify the exhaust gases arising because of the combustion of the fuel.

An exhaust-gas recirculation pipe 13 leads from the exhaust-gas pipe 8 back to the intake manifold 7. An exhaust-gas recirculation valve 14 is accommodated in the exhaust-gas recirculation pipe 13. With this valve 14, the quantity of the exhaust gas, which is recirculated into the intake manifold 7, can be adjusted. The exhaust-gas recirculation pipe 13 and the exhaust-gas recirculation valve 14 define a so-called exhaust-gas recirculation.

A tank-venting line 16 leads from a fuel tank 15 to the intake manifold 7. A tank-venting valve 17 is mounted in the tank-venting line 16 and, with this valve 17, the quantity of the fuel vapor from the fuel tank 15, which is supplied to the intake manifold 7, can be adjusted. The tank-venting line 16 and the tank-venting valve 17 define a so-called tank venting.

The piston 2 is displaced by the combustion of the fuel in the combustion chamber 4 into a back and forth movement which is transmitted to a crankshaft (not shown) and applies a torque thereto.

Input signals 19 are applied to a control apparatus 18 and these signals define measured operating variables of the engine 1. For example, the control apparatus 18 is connected to an air-mass sensor, a lambda sensor, an rpm sensor and the like. Furthermore, the control apparatus 18 is connected to an accelerator pedal sensor which generates a signal which indicates the position of an accelerator pedal, which can be actuated by the driver, and therefore indicates the requested torque. The control apparatus 18 generates output signals 20 with which the performance of the engine 1 can be influenced via actuators or positioning devices. For example, the control apparatus 18 is connected to the injection valve 9, the spark plug 10 and the throttle flap 11 and the like and generates the signals required to drive the same.

The control apparatus 18 is, inter alia, provided to control (open loop and/or closed loop) the operating variables of the engine 1. For example, the fuel mass, which is injected by the injection valve 9 into the combustion chamber 4, is controlled (open loop and/or closed loop) by the control apparatus 18 especially with respect to a low fuel consumption and/or a low development of toxic substances. For this purpose, the control apparatus 18 is provided with a microprocessor in which a program is stored in a memory medium, especially in a flash memory, and this program is suited to execute the above-mentioned control (open loop and/or closed loop).

The engine 1 of FIG. 1 can be operated in a plurality of operating modes. Accordingly, it is possible to operate the engine 1 in a homogeneous mode of operation, a stratified mode of operation, a homogeneous lean operation and the like.

In the homogeneous operation, the fuel is injected by the injection valve 9 during the induction phase directly into the combustion chamber 4 of the engine 1. The fuel is thereby substantially swirled up to ignition so that an essentially homogeneous air/fuel mixture arises in the combustion chamber 4. The torque to be generated is adjusted by the control apparatus 18 essentially via the position of the throttle flap 11. In homogeneous operation, the operating variables of the engine 1 are so controlled (open loop and/or closed loop) that lambda is equal to one. The homogeneous operation is especially used at full load.

The homogeneous lean operation corresponds substantially to the homogeneous operation, however, the lambda is set to a value of less than one.

In stratified operation, the fuel is injected by the injection valve 9 directly into the combustion chamber 4 of the engine 1 during the compression phase. In this way, no homogeneous mixture is present in the combustion chamber 4 with the ignition by the spark plug 10; instead, a fuel stratification is present. The throttle flap 11 can be completely opened except for requests, for example, of the exhaust-gas recirculation and/or of the tank venting and the engine 1 can thereby be operated dethrottled. The torque to be generated is, in stratified operation, substantially adjusted via the fuel mass. With the stratified operation, the engine 1 can be operated especially at idle and at part load.

There can be a back and forth switching or switchover between the above-mentioned operating modes of the engine 1. Such switchovers are executed by the control apparatus 18.

In the operation of the engine 1, faults in the exhaust-gas recirculation can occur, which trigger different fault reactions. Here, at least three cases can be distinguished.

(1) The exhaust-gas recirculation valve 14 jams in the open state and can therefore no longer be closed. If an exhaust-gas recirculation valve 14, which jams in the open state, is determined, for example, by a position sensor or other measures, then the engine 1 is switched into the stratified operation. In the stratified operation, the engine 1 can be operated with limited engine power even with an open exhaust-gas recirculation valve 14 so that an emergency operation is possible. The exhaust-gas limit values can be maintained.

(2) The exhaust-gas recirculation valve 14 jams in the closed state and can no longer be opened. If an exhaust-gas recirculation valve 14 jammed in the closed state is determined, then the engine 1 is switched over into the homogeneous operation. In the homogeneous operation, the engine 1 can be easily operated with the exhaust-gas recirculation valve 14 closed without exceeding exhaust-gas limit values. Basically, the stratified operation would also be possible, but here, prescribed exhaust-gas limit values, if required, could no longer be maintained.

(3) Some other fault is determined in the exhaust-gas recirculation or in the control (open loop and/or closed loop) of the exhaust-gas recirculation and the exhaust-gas recirculation valve 14 can be closed. In this case, the engine 1 is switched over into the homogeneous operation and the exhaust-gas recirculation valve 14 is closed. As already explained, the engine 1 can be easily operated in the homogeneous operation even with a closed exhaust-gas recirculation valve 14 without affecting exhaust-gas limit values.

The determination of a fault in the exhaust-gas recirculation or on the exhaust-gas recirculation valve 14 can take place directly or indirectly by the control apparatus 18 with the aid of sensors and/or via the diagnosis of the actuator which drives the exhaust-gas recirculation valve 14 or via some other method measures. The corresponding emergency operation is selected and adjusted in dependence upon the detected fault by the control apparatus 18 in correspondence to the above cases. Thereafter, an input into a fault memory of the control apparatus 18 takes place.

What is claimed is:

1. A control element including a read-only-memory or flash memory for a control apparatus of an internal combustion engine including an engine of a motor vehicle, the engine including an exhaust-gas recirculation system having an exhaust-gas recirculation valve, said control element comprising a program stored on said control element which can be run on a computing apparatus including a microprocessor, and said program being configured to carry out the method steps of:

injecting fuel into a combustion chamber of said engine in a first operating mode during a compression phase and in a second operating mode during an induction phase; and, switching said engine into said first operating mode when said exhaust-gas recirculation valve is jammed in the open state thereof.

2. An internal combustion engine including an engine of a motor vehicle, the engine comprising:

a combustion chamber wherein fuel is injectable in a first operating mode during a compression phase and in a second operating mode during an induction phase;

a control apparatus for controlling a switchover between said first and second operating modes;

an exhaust-gas recirculation system having an exhaust-gas recirculation valve; and, said control apparatus including means for switching said engine into said first operating mode when said exhaust-gas recirculation valve is jammed in the open state thereof.

3. A control apparatus for an internal combustion engine including an engine of a motor vehicle, the engine having a combustion chamber into which fuel can be injected in a first operating mode during a compression phase and in a second operating mode during an induction phase, the engine including an exhaust-gas recirculation system having an exhaust-gas recirculation valve, the control apparatus comprising:

means for injecting fuel into a combustion chamber of said engine in a first operating mode during a compression phase and in a second operating mode during an induction phase; and, means for switching said engine into said first operating mode when said exhaust-gas recirculation valve is jammed in the open state thereof.

4. A method for operating an internal combustion engine including an internal combustion engine of a motor vehicle, the engine including an exhaust-gas recirculation system having an exhaust-gas recirculation valve and the method comprising the steps of:

injecting fuel into a combustion chamber of said engine in a first operating mode during a compression phase and in a second operating mode during an induction phase; and, switching said engine into said first operating mode when said exhaust-gas recirculation valve is jammed in the open state thereof.

5. The method of claim 4, wherein the engine is switched into the second operating mode when the exhaust-gas recirculation valve is jammed in the closed state.

6. The method of claim 4, wherein, for another fault function of the exhaust-gas recirculation system, the exhaust-gas recirculation valve is closed and the engine is switched into the second operating mode.

7. The method of claim 4, wherein a jamming of the exhaust-gas recirculation valve is determined with the aid of a sensor.

* * * * *

UNITED STATES PATENT AND TRADEMARK OFFICE
CERTIFICATE OF CORRECTION

PATENT NO. : 6,722,350 B2
DATED : April 20, 2004
INVENTOR(S) : Dieter Volz et al.

It is certified that error appears in the above-identified patent and that said Letters Patent is hereby corrected as shown below:

Title page,
Item [30], Foreign Application Priority Data, "Jan. 15, 2002" should read -- Jan. 15, 2000 --.

Signed and Sealed this

Twenty-ninth Day of June, 2004

JON W. DUDAS
*Acting Director of the United States Patent and Trademark Office*